United States Patent [19]

Evans

[11] Patent Number: 4,546,877
[45] Date of Patent: Oct. 15, 1985

[54] FISHING ROD AND REEL COVER

[76] Inventor: Jack L. Evans, 10842 Devonshire Cir., Penn Valley, Calif. 95946

[21] Appl. No.: 586,031

[22] Filed: Mar. 5, 1984

[51] Int. Cl.⁴ .............................................. A45F 5/00
[52] U.S. Cl. ........................... 206/315.11; 206/315.1; 224/920; 224/922
[58] Field of Search ....................... 206/315.1, 315.11; 224/920, 922

[56] References Cited

U.S. PATENT DOCUMENTS

| | | | |
|---|---|---|---|
| 2,532,119 | 11/1950 | Reynolds | 224/922 |
| 2,598,334 | 5/1952 | Ahlburg | 383/74 |
| 2,650,449 | 9/1953 | Suring | 206/315.11 |
| 2,749,645 | 6/1956 | McKern | 206/315.11 |
| 2,962,187 | 11/1960 | Morris | 206/315.11 |
| 3,191,652 | 6/1965 | Benson et al. | 224/901 |
| 3,641,697 | 2/1972 | Heidtman et al. | 206/315.11 |
| 3,674,190 | 7/1972 | Wright | 206/315.11 |
| 4,170,801 | 10/1979 | Ward | 206/315.11 |
| 4,171,588 | 10/1979 | Hoffman et al. | 206/315.11 |

FOREIGN PATENT DOCUMENTS 205862  10/1923  United Kingdom ................. 383/75

Primary Examiner—William T. Dixson, Jr.
Assistant Examiner—Brenda J. Ehrhardt
Attorney, Agent, or Firm—Roger A. Marrs

[57] ABSTRACT

A cover and carrier for an assembled fishing rod and reel is disclosed herein having an elongated, rigid tube enclosing the length of rod and a cushioned pouch attached to one end of the tube for housing the reel. A closure is provided for closing an opening or entrance into the pouch while a cap seals the opposite end of the tube. A compression ring or clamp secures the pouch with the tube so that the interiors of the pouch and tube are coextensive.

1 Claim, 3 Drawing Figures

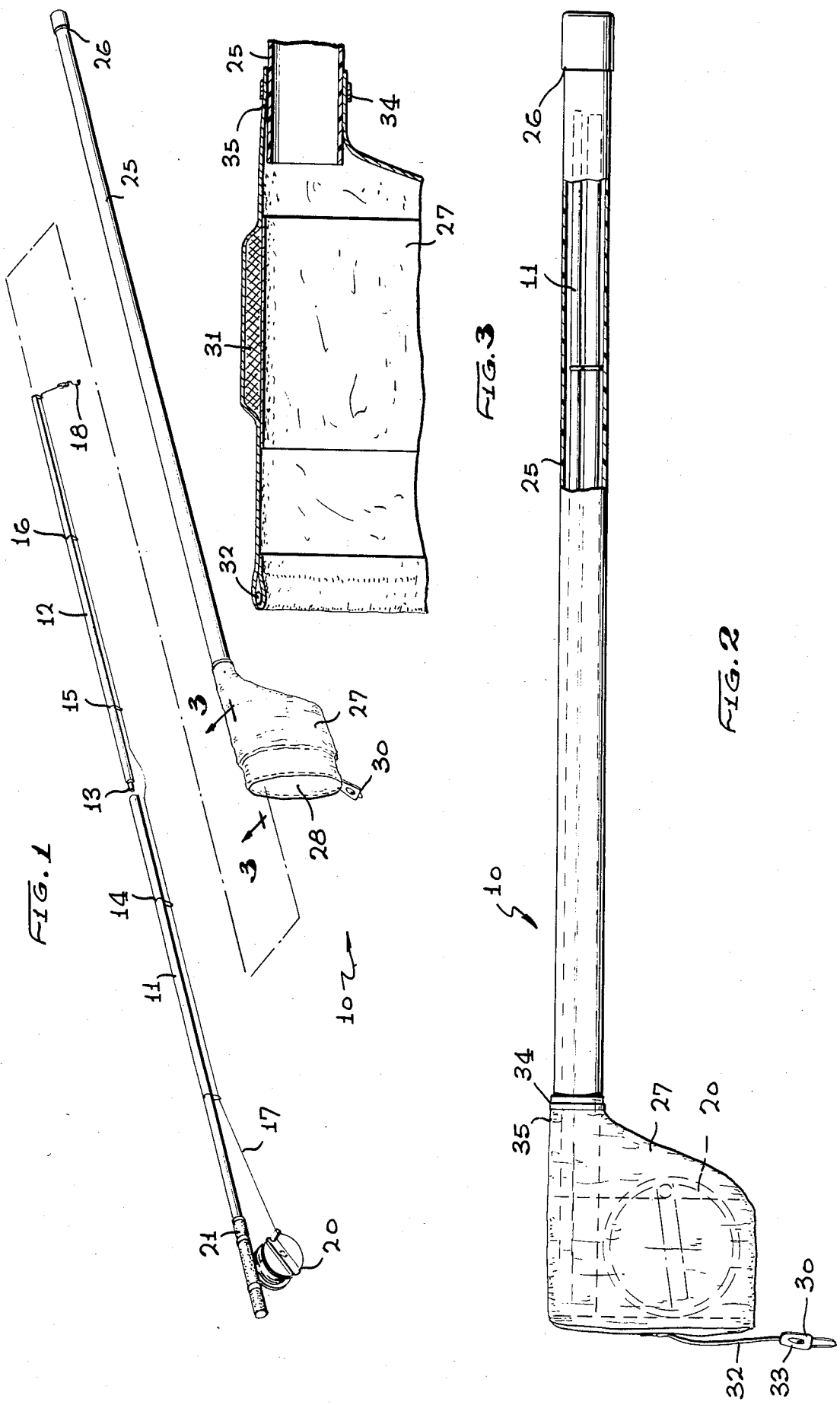

FISHING ROD AND REEL COVER

BACKGROUND OF THE INVENTION

1. Field of the Invention

The present invention relates to fishing rod covers and carriers and, more particularly, to a novel cover for enclosing an assembled fishing rod and reel as a unit whereby the assembly is adequately protected against abuse during transport or storage.

2. Brief Description of the Prior Art

In the past, it has been the conventional practice to protect sports equipment such as fishing reels and rods by initially disassembling the equipment and placing the various components thereof into separate storage boxes, carriers and traveling bags. In some instances, the storage boxes are rigid and inflexible while in other instances, the bags or containers are flexible with limited padding for protection of goods carried therein. However, in all of these instances, the equipment is initially disassembled or broken down into component parts which is a time consuming step and particularly so when it is understood that reassembly is necessary when the equipment is intended to be immediately used again. Also, certain portions of the equipment may require a rigid protector while other components of the equipment may be protected with only a cloth or pliable material.

Therefore, a long standing need has been present to provide a novel means for enclosing and protecting equipment such as an assembled fishing rod and reel so that the equipment need not be taken apart or broken down for storage with the attendant need for subsequent reassembly when ready for use. Such means should take into account the necessity for rigidizing portions of the cover or carrier and, at the same time, providing cushioning means and pliable material about other portions of the equipment not requiring the rigid protection.

SUMMARY OF THE INVENTION

Accordingly, the above problems and difficulties are obviated by the present invention which provides a novel cover or carrier for an assembled fishing reel and rod which includes an elongated hollow tube for insertably receiving the length of fishing rod in its assembled condition with line and hook and which further includes a pliable and cushioned pouch attached to one end of the tube for enclosing the fishing reel and its mechanism. Closure means are provided on the pouch for selectively closing the opening or entrance leading into the pouch and suitable clamping or securement means are provided for attaching the pouch to the one end of the tube. A cap is attached to the opposite end of the tube for sealing thereof and suitable cushion material is incorporated into the pouch at a strategic location immediately adjacent to the joining of the pouch to the tube for the protection of critical reel components.

Therefore, it is among the primary objects of the present invention to provide a novel cover for an assembled fishing reel and rod construction whereby the components of the construction are protected from environmental hazards without the necessity of taking the construction apart and individually enclosing separate components thereof.

Another object of the present invention is to provide a novel cover for an assembled fishing reel and rod construction whereby the flexible portion of the construction, namely the rod, is protected by a rigid tube and the components of the reel are protected by a cushioned pouch attached to one end of the rigid tube.

Yet another object of the present invention is to provide a novel covering and carrier for a fishing reel and rod assemblage including a cushioned pouch for protection of the reel and a rigid length of tube for enclosing the rod while the assembly is fully connected for use including fishing line, hooks, sinkers and the like.

Still a further object of the present invention is to provide a novel cover and carrier for an assembled fishing rod and reel which may be useful in transporting a fully assembled fishing rod and reel from one place to another while all of the components of the assemblage are covered and protected from environmental hazards.

BRIEF DESCRIPTION OF THE DRAWINGS

The features of the present invention which are believed to be novel are set forth with particularity in the appended claims. The present invention, both as to its organization and manner of operation, together with further objects and advantages thereof, may best be understood by reference to the following description, taken in connection with the accompanying drawings in which:

FIG. 1 is an exploded perspective view of the novel fishing reel and rod assemblage cover and carrier incorporating the present invention;

FIG. 2 is an enlarged side elevational view of the cover and carrier shown in FIG. 1; and FIG. 3 is longitudinal cross-sectional view of the pouch portion of the cover and carrier shown in FIGS. 1 and 2.

DESCRIPTION OF THE PREFERRED EMBODIMENT

Referring to FIG. 1, the novel cover and carrier of the present invention is shown in the general direction of arrow 10 which is intended to house a conventional fishing rod and reel assemblage. The assemblage includes an elongated pole having sections 11 and 12 which are generally connected together by means of a threaded connection 13. The pole is generally flexible and includes a plurality of line guides such as eyelets 14, 15 and 16 through which a conventional fishing line 17 passes. One end of the fishing line carries a hook 18 while the opposite end is stored on the spool of a fishing reel 20. As is normal practice, the reel 20 is attached to the fishing pole 11 at a handle 21. It is normal practice when not using the fishing reel to disassemble the reel from the pole and further to disassemble the various pole sections from one another after the fishing line, sinkers and hooks have been removed. However, in the present instance, the assembled rod and reel including line and hook is intended to be insertably placed into the cover and carrier 10.

The cover and carrier 10 includes an elongated rigid tube 25 closed at one end by a cap 26 and carrying at its opposite end, a pouch 27. The pouch includes an entrance or opening 28 which is selectively closed by a releasable closure 30 when the rod and reel have been properly disposed inside the cover and carrier. In one form, the closure means 30 includes a drawstring which gathers about the fabric material at the entrance 28 to effect closure.

The pouch may be formed of a fabric material which is reinforced by a cushioned material such as indicated by numeral 31 in FIG. 3.

As shown more clearly in FIG. 2, the length of the rod 11 is disposed within the hollow bore of the tube 25 while the reel 20 is contained within the protection of the pouch 27. The closure 30 comprising the drawstring 32 and a friction clasp or slider 33 effects closure of the entrance 28. The pouch 27 is secured to the end of the tube 25 opposite from its end carrying cap 26 by means of a clamp or compression ring 34 which secures a neck or cylindrical fabric portion 35 to the rigid rod 25.

FIG. 3 more clearly shows the attachment of the portion 35 to the rod and further illustrates that the interior of the rod is in communication and coextensive relationship with the interior of the pouch 27. The material for cushioning the reel is disposed in a compartment between adjacent layers of material so as to surround the delicate mechanism of the reel when the reel is enclosed by the pouch.

Therefore, it can be seen that the assembled fishing rod and reel construction may be inserted through the entrance 28 so that the rod occupies the interior of the tube 25 while the reel occupies the interior of the pouch 27. The drawstring and slider 32 and 33 may be actuated to close the entrance 28 to fully enclose the assemblage therein. The cushioned material 31 protects the reel while the tube 25 protects the rod. In some instances, when the rod is extremely long the sections of the rod may be disassembled and individually inserted into the tube 25. However, it is to be understood that this is not a full disassembly since the fishing reel is still attached to the handle 21 and the fishing line still passes through the eyelets and the hook and sinkers are attached. The hook is fully enclosed by the tube and is not available for snagging and catching as would normally be the case if the assemblage were carried from place to place without a cover or shield. The pouch is preferably composed of a pliable fabric material while the tube 25 is preferably composed of a rigid plastic material or other high strngth to weight ratio material.

While particular embodiments of the present invention have been shown and described, it will be obvious to those skilled in the art that changes and modifications may be made without departing from this invention in its broader aspects and, therefore, the aim in the appended claims is to cover all such changes and modifications as fall within the true spirit and scope of this invention.

What is claimed is:

1. A cover and carrier for an assembled fishing rod and reel combination, comprising:
    an elongated rigid hollow tube for insertably receiving the rod portion of said fishing rod and reel combination;
    a fabric pouch secured to one end of said tube for enclosing the reel portion of said fishing rod and reel combination;
    cushion material carried externally on said pouch for encircling said reel portion;
    a cap secured to the end of said tube opposite to its end secured to said pouch;
    said tube is composed of rigid material and said pouch is composed of a pliable fabric;
    said pouch includes a reduced circular portion insertably receiving the end of said tube;
    securement means disposed about said circular portion clamping said pouch to said tube;
    said pouch includes an opening for insertably receiving said fishing rod and reel combination;
    a drawstring closure operably carried on said pouch for selectively closing said pouch opening; and
    said cushion material being a band of thick material disposed in a continuous pad around said pouch disposed between said pouch and tube securement means and said pouch opening.

* * * * *